United States Patent [19]
Mann et al.

[11] Patent Number: 5,260,690
[45] Date of Patent: Nov. 9, 1993

[54] ARTICLE REMOVAL CONTROL SYSTEM

[75] Inventors: Graeme R. Mann, Engadine; Rick L. Naylor, Glenmore Park, both of Australia

[73] Assignee: Minnesota Mining and Manufacturing Company, St. Paul, Minn.

[21] Appl. No.: 907,697

[22] Filed: Jul. 2, 1992

[51] Int. Cl.⁵ .............................................. G08B 13/24
[52] U.S. Cl. .................................. 340/572; 340/551; 340/825.31; 364/403
[58] Field of Search .................. 340/572, 551, 825.31; 364/403

[56] References Cited
U.S. PATENT DOCUMENTS

| | | | |
|---|---|---|---|
| 3,423,674 | 1/1969 | Goldsmith et al. | 324/251 |
| 3,665,449 | 5/1972 | Elder et al. | 340/572 |
| 4,141,078 | 2/1979 | Bridges, Jr. et al. | 364/419 |
| 4,153,931 | 5/1979 | Green et al. | 395/600 |
| 4,595,922 | 6/1986 | Cobb et al. | 340/825.49 |
| 4,661,806 | 4/1987 | Peters et al. | 340/568 |
| 4,881,061 | 11/1989 | Chambers | 340/568 |
| 5,124,699 | 6/1992 | Tervoert et al. | 340/572 |

Primary Examiner—Glen R. Swann, III
Attorney, Agent, or Firm—Gary L. Griswold; Carolyn A. Bates; Peter Forrest

[57] ABSTRACT

A responder assembly for an article inventory control system employs a plurality of sensors for detection of sensitized markers attached to inventory items. By processing signals from each of the plurality of sensors, a detection pattern is provided to determine whether none, one, or more than one marker is present within a zone of sensitivity.

28 Claims, 9 Drawing Sheets

ARTICLE REMOVAL CONTROL SYSTEM

TECHNICAL FIELD

The present invention relates to a system for controlling removal of a specifically identified article from a facility by a specifically authorized user and, in particular, discloses variations to the arrangement disclosed in Australian Patent No. 607,642 the disclosure of which is hereby incorporated by cross-reference.

BACKGROUND

Article inventory control (AIC) systems, in general, authorize, track, and control movement of a given article within a facility by a given user. An example is a library circulation control system. In this case, a user could identify himself or herself with an identification card containing magnetically or optically detectable data (e.g., a barcode). The articles, books in the collection of the library, typically have a similar identifying label. Usually a computerized user database contains identification data on all registered patrons of the library, and a similar article database contains identification data on all books in the library. When someone desires to remove a book from the library, the library circulation control system will first verify that the person is an authorized patron of the library, i.e., that the person is authorized to check out any book, or any of a particular class of books. The system will then verify that the particular book may be removed from the library, e.g., that is not "on reserve". If both the user and the book are authorized by the system, the book may be removed. ("checked out") by that user. This authorization is often a visual or audible signal to library personnel. Additionally, but not required, the system can maintain data which correlates the specific user with the specific books checked out, and may issue fine notices, usage reports, and the like.

To prevent unauthorized removal of articles by users of facilities, electronic article surveillance (EAS) systems may also be employed. An electronic article surveillance system is defined as a system which comprises:

(1) a remotely interrogatable marker attached to a given article;

(2) means for interrogating and sensing the marker within an interrogation zone, thereby determining presence of the article; and (3) means for preventing removal of the article by a user of the facility.

For the purposes of this invention, the term "removal" is understood to include the ability of the user to gain access to an article, to move an article from one point to another within a facility, to bring an article into a facility, or to remove an article from a facility. The last of these is a common use of EAS systems. However, an EAS system as defined above can control, for example, the routing of articles from one portion of a factory assembly line to another.

Many EAS systems employ a magnetically activateable "marker" attached to an article, with appropriate marker interrogation and sensing apparatus located at one or more locations in the facility. Typically, removal of an article is prevented by restricting movement of the article within or from the facility, as with a lockable exit gate. The gate is locked in response to an alarm signal when a marker is detected within an interrogation zone located immediately before the exit. In the library example used above, the marker may comprise a piece of magnetic material adapted to be inserted in the book spine or attached inside the book cover.

Typically, EAS systems employ permanently or reversibly deactivatable markers and the apparatus associated with them. Such markers are also known as "dual status" markers. Permanently deactivatable markers are preferred where it is appropriate in certain circumstances for an article to pass through the interrogation zone without preventing removal. For example, in a retail store, if an article of merchandise has been purchased in a particular department, the marker may be deactivated at that point so that an interrogation zone in another department will not activate the marker. Reactivatable markers are appropriate, for example, in libraries where patrons who check out a book for an extended period of time may subsequently visit the library with that book during that period. In this case, the system should not prevent subsequent removal of the book until the book has been returned, the marker reactivated, and the book returned to circulation.

The deactivate/reactivate devices are designed for operation on a single sensitized article of typically maximum dimensions. However, they will function also on a plurality of sensitized articles whose combined dimensions equal the maximum. The deactivate/reactivate device cannot distinguish between a single large or multiple small sensitized articles.

Integration of the functions of the two systems described above into a single system is known in the art. For example, U.S. Pat. No. 3,665,449 (Elder et al.) at column 15, lines 62-67 generally suggests that automated library checkout systems may be combined with EAS systems. More specifically related to the present invention, U.S. Pat. No. 4,141,078 (Bridges, Jr. et al.) discloses an automated library circulation Control system which provides for patron identification via card reader, book identification via an optical reader, modification and interrogation of computer data files, an electromagnetic device for magnetizing and demagnetizing a magnetic strip in each book, detection of unauthorized removal of books from the library, and other functions. The disclosure of U.S. Pat. No. 4,141,078 (Bridges, Jr. et al.) is incorporated by reference into this application.

Application of this type of integrated system may be difficult, especially in libraries in which one or both of the individual systems are in current operation. For example, some existing EAS systems cannot distinguish individual markers, only whether a sensitized marker is present. Thus a single library might employ markers which are identical, even on different types of books in the collection. The marker therefore may not already contain coded inventory data which could identify the type of article to which it is attached. A library with such an EAS system in place, but no computerized inventory control system, would have to add a unique inventory control marker to each book.

Many libraries may already use a system of coded inventory marking, but as no industry standard exists as to the type, coding, construction or placement of these markers, they can be expected in any size, or coding scheme and positioned in any orientation on either front, back or inside cover.

Each book generally must be uniquely identified, including the identification of multiple copies of a single title, some of which may be in general circulation and one being on reserve.

Furthermore, present EAS systems generally are not designed to receive removal authorization signals from AIC systems added later. Thus, for complete article removal control in such a facility, it is necessary to have separate article inventory control and article surveillance systems, and usually a manual, labor intensive, connection between the two. In a library, such a connection might be a circulation clerk who, seeing a flashing light on the AIC system indicating book removal authorization, physically passes a book through a marker deactivation device of the EAS system. Another possibility is for the circulation clerk to manually bypass the removal prevention means, e.g., physically passing the book around the interrogation device and handing the book to the patron on the other side of the lockable gate. Since the patron would pass through the interrogation zone without any marked books, the gate would remain unlocked and thus allow the patron to exit the library.

SUMMARY OF THE INVENTION

In accordance with one aspect of the present invention there is disclosed a responder assembly comprising:
a plurality of sensors,
means for creating an electromagnetic field within a zone of sensitivity associated with each said sensor, said field being adapted to energize one or more sensitized markers located within said zones which thereby transpond energy for detection by one or more of said sensors, and processing means connected to each said sensor for providing a detection pattern corresponding to detection of responded energy from one or more of said sensors, said pattern being processed to determine whether none, one or more than one said markers is present within said zones.

BRIEF DESCRIPTION OF THE DRAWINGS

A preferred embodiment of the present invention will now be described with reference to the drawings in which.

DETAILED DESCRIPTION

Figure 1:
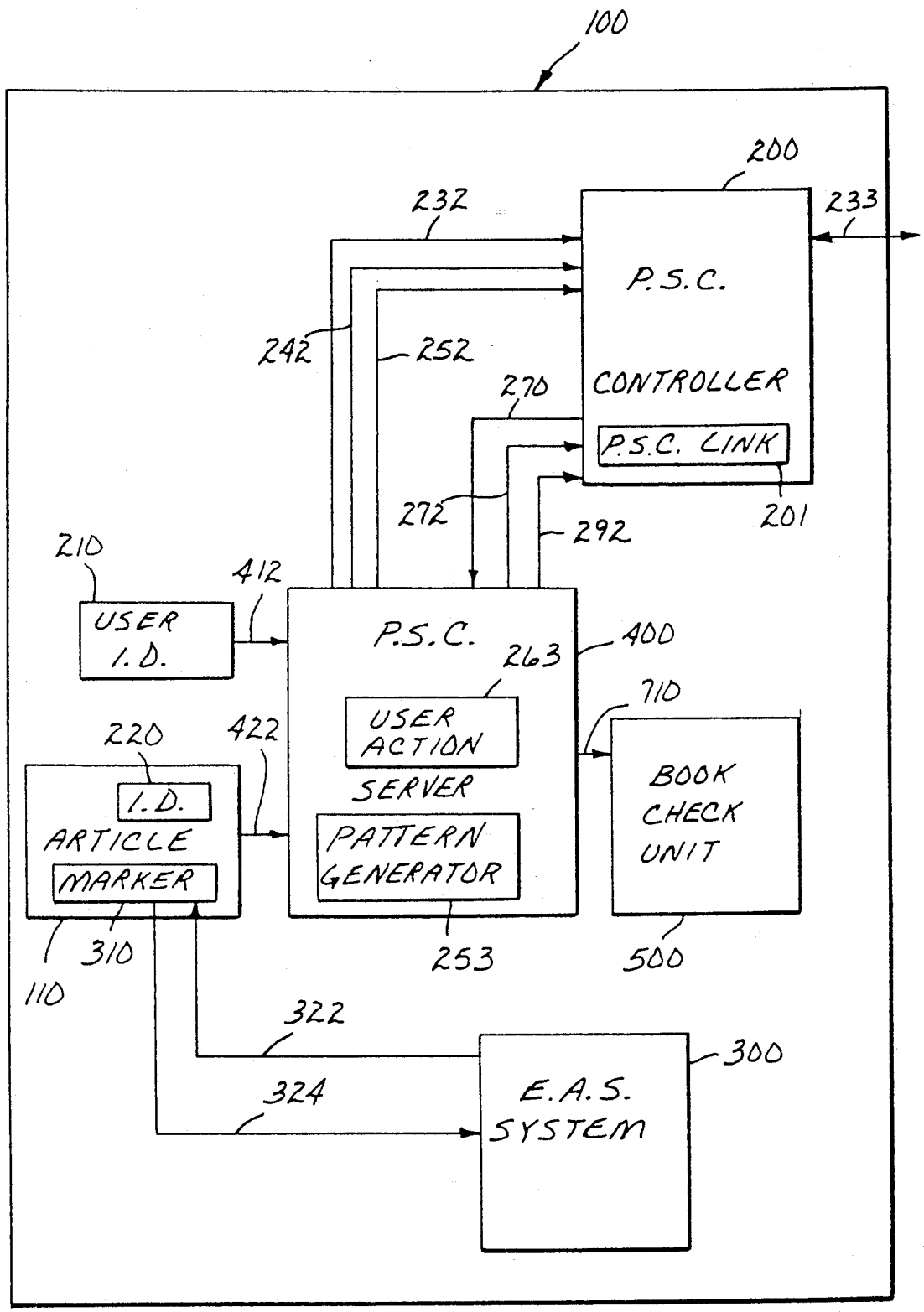
FIG. 1 is a schematic block diagram of the preferred embodiment and associated components.
Figure 2:
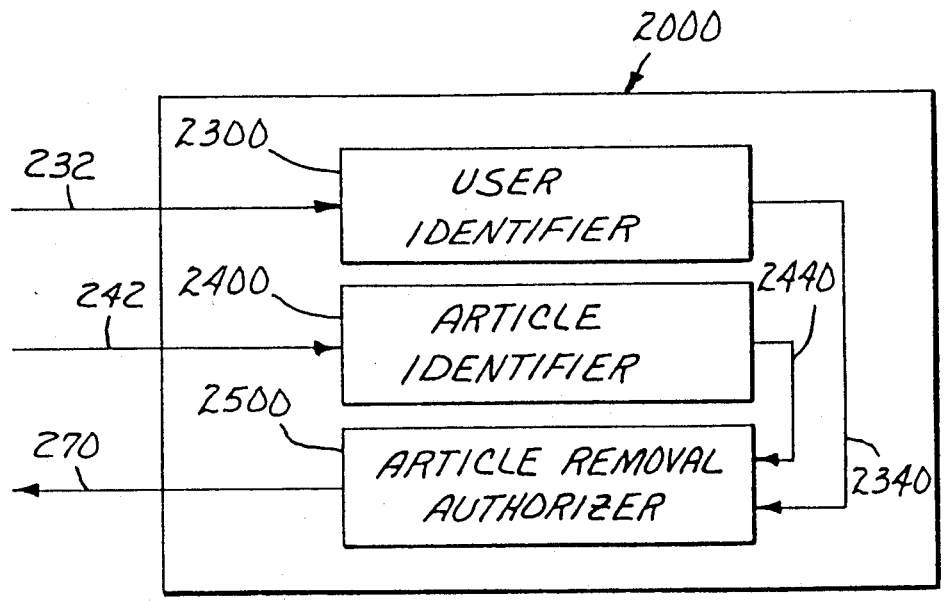
FIG. 2 is a schematic block diagram of a prior art article inventory control system.
Figure 3:
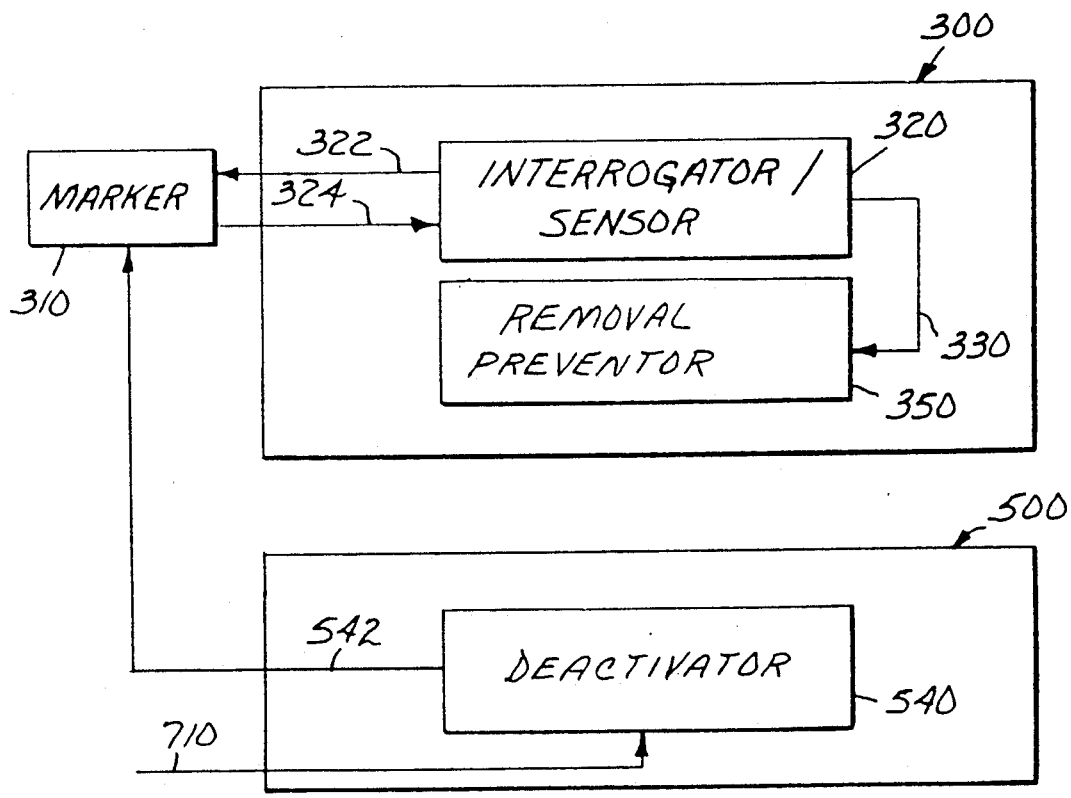
FIG. 3 shows schematic block diagrams of components of FIG. 1.

FIGS. 1-3 show the major components of the preferred embodiment of a Patron Self Check (PSC) system located within a portion of a facility generally indicated as 100.

Within the facility is at least one article 110 attached to which are Article Identification Code 220 and an Electronic Article Surveillance (EAS) Marker 310. The Code 220 could be a label, similar to a Universal Product Code (UPC) label.

A PSC Controller 200, Electronic Article Surveillance 300 and Book Check Unit 500 can exist within the facility 100 prior to the installation, or may be installed with at least one PSC Server Terminal 400.

Associated with the PSC Server 400 is one of more User Identification Cards 210. In general, each user (not shown) of the facility 100 is identifiable through the User Identification Card, and each Article 110 through the corresponding Article Identification Code 220. The Article Identification Code 220 generally is permanently affixed to the article itself, embedded or inscribed on the article, or affixed to a tag adapted to be attached to the article.

The PSC Server 400 sends an Activation Signal 710 to the Book Check Unit 500 when an Article Authorization 270 is received from the PSC Controller 200 in the usual manner.

The PSC Server 400 also contains a Pattern Generator 253 which senses a pattern of the Sensitized Markers 310. The Server 400 also senses the presence of an Article 110 within a desensitizing area provided therein. It also contains user activated indication that the user is requesting service from the PSC Server 400 by a User Activating Device 263.

A PSC Controller 200 is provided including a PSC Link 201 whereby information, from the PSC Server 400, as to User I.D. and Article I.D., is received on Lines 232 and 242 respectively. This information is then sent to the customer's data base (not illustrated) on Line 233 for confirmation that the transaction can proceed.

The PSC Controller 200 also receives information from the PSC Server 400 regarding a pattern of sensitized markers that have been detected by the Pattern Generator 253. This pattern is received on Line 252 and from the pattern received, the PSC Controller 200 through the PSC Link 201, determines as to whether there is more than one sensitized marker present within the desensitizing area.

The PSC Controller 200, through PSC Link 201, also receives information from the PSC Server 400 that an Article 110 has been detected as being present in the desensitizing area of the Book Check Unit 500 and that the user has requested action by the activation of User Action Device 263, on Lines 272 and 292 respectively.

The PSC Controller 200, through PSC Link 201, receives confirmation from the customers data base on Line 233 that the check-out action can proceed and then determines from the Pattern Generator 253 that only one Article 110 is present in the desensitizing area of Pattern Generator 253. This determination results in the PSC Controller 200, through PSC Link 201, enabling Line 270 to the PSC Server 400 to activate the Article Removal Authorization Function 710.

The EAS System 300 interrogates the EAS Marker 310 with an Interrogation Signal 322 and upon receipt of a Verified Removal Response 324 allows the user to remove the article 110 from the facility 100.

In this way communication between the separate systems 200, 300 and 500 is established. The result is that the EAS System 300 permits a given article to be removed from the facility only by a given authorized user, having ensured that only one article per transaction has been authorized for removal.

The preferred embodiment utilizes existing PSC Controller signals in the integration of PSC and EAS functions without requiring any modifications to the EAS System or any hard-wiring between the two systems. In order to disclose this, additional information description of the PSC and EAS systems is useful.

FIG. 2 is a schematic block diagram of a typical prior art Article Inventory Control System 2000 which can be replaced by the PSC Controller 200 of FIG. 1. As stated above, inputs to this system are the transmitted User Identification Signal 232, and the transmitted Article Identification Signal 242. The output from the system is the Article Removal Authorization Signal 270. The transmitted User Identification Signal 232 is evaluated by a User Identifier 2300 (e.g. a data base is searched), and a determination is made whether the user is known to the system. If so, a verified User Identification Signal 2340 is issued to an Article Removal Authorizer 2500. Similarly, the transmitted Article Identification Signal 242 is evaluated by an Article Identifier 2400 (e.g. another data base is searched), and a determination is made whether the article is known to the system. If so, an Article Identification Signal 2440 is issued to the Article Removal Authorizer 2500. The Article Removal Authorizer 2500 uses both verified Identification Signals 2340 and 2440 to decide if the user is authorized to remove the article from the facility. (Additional consideration, not shown, may include the time of day, number of previous removal requests by a given user in a day, and the like). If so, an Article Removal Authorization Signal 270 is produced. If any of the evaluations, determinations, etc., above indicate an unauthorized user and/or unauthorized article the Article Removal Authorization Signal 270 is not produced.

FIG. 3 is a schematic block diagram of a typical Electronic Article Surveillance System 300, and a Book Check Unit 500. The EAS system, generally arranged at an exit of a library or retail store for example, sends an Interrogation Signal 322 to the EAS Marker 310 and receives the sensed Signal 324 from the EAS Marker 310. Typically, the Interrogation Signal 322 results in an alternating magnetic field of known intensity and frequency in an interrogation zone. The sensed Signal 324 is induced as a result of the alternating magnetization in the marker 310 in response to the Interrogation Signal 322, and comprises multiple harmonics of the interrogation signal. When an activated EAS Marker 310 is interrogated and sensed by an Interrogator/Sensor 320, an Activation Status Signal 330 is created. This signal is used by a Removal Preventer 350, such as a lockable gate for example, to decide if the article to which the activated marker is attached may be removed from the facility.

The embodiment shown in FIG. 3 is suitable for use with permanently deactivatable markers. Accordingly, the EAS System 300, further comprises a Deactivator 540 which forms part of the Book Check Unit 500 and, which receives the verified Article Removal Authorization Signal 710 from the Terminal 400. Additionally the receipt of Signal 710 energizes the deactivator 540, which in turn emits Deactivation Signal 542 to the marker 310. Typically, Deactivation Signal 542 is a high intensity non-alternating magnetic field. Once the Marker 310 is permanently deactivated, the sensed Signal 324 is not produced upon subsequent interrogation, and thus the Activation Status Signal 330 is as if no marker were sensed at all. Therefore, the Removal Preventer 350 does not prevent the user to remove the article.

Generally, when the Deactivator 540 is not provided with the Authorization Signal 710, it outputs a low energy alternating magnetic field.

An alternative embodiment similar to the above is suitable for EAS Systems employing reactivatable markers. In this case, there is at least two signals received by the EAS System from the terminal. One signal is the verified Article Removal Authorization Signal 710, which is used, for example, to allow a library user to remove a book from the library upon "check out". Upon receipt of this signal, the system operates as described above, except the marker is only temporarily deactivated. A second signal (not shown) energizes a reactivator (also not shown), which emits a suitable signal to restore a temporarily deactivated marker to active status. This is used, for example, to allow a library user to return a book to the library upon "check in".

Regardless of the type of marker chosen, removal of articles by users determined to be authorized by the Article Inventory Control System is accomplished by requiring an appropriate Activation Status Signal 330 as described above.

Figure 4:
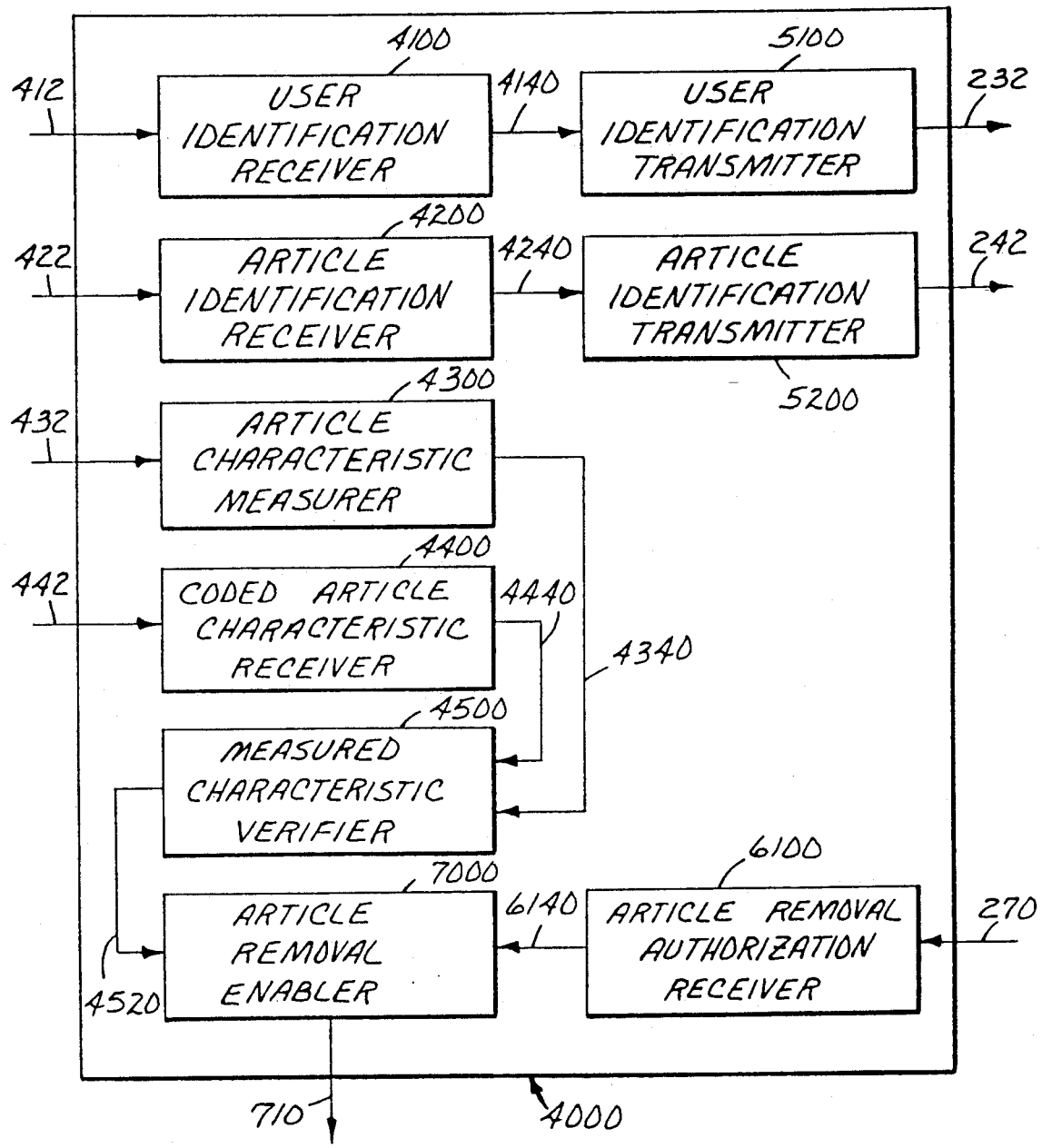
FIG. 4 is a schematic block diagram of a typical prior art AIC system controller.

FIG. 4 is a schematic of a typical prior art of an Article Inventory Control (AIC) System Controller 4000 which contains a device for the ultra-sonic width measurement of an Article 432. This width measurement is then compared against a record of the article's width which can either be contained in an extended Article Characteristic Coded Label 442 attached to the article or can be a record maintained on a data base which is searched as a part of the Authorized Article Removal operation.

Integral to the successful operation of this art is the required labelling of each article contained in a facility. This action may be in addition to a labelling function that has already occurred wherein the customer has an existing quantity of articles that have already been labelled with the Article Identifier 442. Alternatively, the successful operation of this art requires creation of a data base which contains a measurement of the width of an article and the linking of this measurement to that article. This may be in addition to a data base which has already been created by the customer to contain other details of the article.

The Terminal Controller 4000 receives the User Identification Data 412, the Article Identification Data 422, the Article Characteristic Measurement 432, the Coded Article Characteristic Measurement 442, and the Article Removal Authorization Signal 270. The terminal 4000 sends the User Identification Signal 232, the Article Identification Signal 242, and the verified Article Removal Authorization Signal 710. A user of the facility who desires to remove an article from the facility enters his or her user identification data into the terminal. This can be done by typing an identification number on an alpha-numeric keypad.

Similarly, the article identification data is entered into the terminal 4000, for example by using an optical scanner to read a barcode on the article. A User Identification Receiver 4100 receives the User Identification Data 412 and sends an Internal User Identification Signal 4140 to the User Identification Transmitter 5100. Similarly, an Article Identification Receiver 4200 receives the Article Identification Data 422 and sends an Internal Article Identification Signal 4240 to the Article Identification Transmitter 5200. Either or both of these processes can involve a translation of the input Signals 412 and 422 into a different encoding format, such as from ASCII to BCD.

The User Identification Transmitter 5100 receives the Internal User Identification Signal 4140 and sends the transmitted User Identification Signal 232 to the User Identifier 320 of the AIC System 2000, described above (FIG. 2). Similarly, the Article Identification Transmitter 5200 receives the Internal Article Identification Signal 4240 and sends the transmitted Article Identification Signal 242 to the Article Identifier 2400, also in FIG. 2. Either or both of these processes can involve a translation of the Internal Signals 4140 and 4240 into a different encoding format, such as ASCII to BCD. It is mandatory that the User and Article Identification Signals 232 and 242 be compatible in coding (e.g. ASCII) and form (e.g. audible tone, varying voltage level, etc.) to the signals which the AIC System is designed to accept.

The article characteristic measurement is made by an Article Characteristic Measurer 4300, which also produces a measured Article Characteristic Signal 434. The coded Article Characteristic Receiver 4400 receives the coded Article Characteristic Measurement 442 representing the same characteristic, but the latter is coded in a form that is not necessarily understandable to the user. For example, with a keypad as described above, the user may enter an alpha-numeric or other code printed on a label attached to the article. Alternatively, if the code is in the form of a barcode, or the like, it may also be automatically entered. The code gives the Value of the characteristic as measured before the article was made available for removal from the facility. In response, the terminal 4000 produces a coded Article Characteristic Signal 4440, and the measured Characteristic Verifier 4500 compares the measured and coded Signals 4340 and 4440 to verify that only the actual article 110, and not just a tag containing the Article Identification Code 220 for example, is in fact present at the terminal. This comparison produces a Characteristic Verification Signal 4520, which is one input to an Article Removal Enabler 7000. The use of a verified measured characteristic of the article 110 is preferred for its accuracy over non-measurement based systems such as that taught in U.S. Pat. No. 4,141,078 (Bridges, et al.), e.g. at column 6, lines 6-14.

Another input to the Article Removal Enabler 7000 is an Internal Article Removal Authorization Signal 6140. This signal is produced by an Article Removal Authorization Receiver 6100, which receives the Article Removal Authorization Signal 270 from the Article Removal Authorizer 2500 of the AIC System 2000, of FIG. 2. As with the User and Article Identification Transmitters 5100 and 5200, the Article Removal Authorization Receiver 6100 can translate the Article Removal Authorization Signal 270 into a different encoding format, such as from ASCII to BCD. It is likewise mandatory that the Article Removal Authorization Receiver 6100 be capable of receiving and understanding the Article Removal Authorization Signal 270 which the AIC System 2000 is designed to emit, including encoding (e.g. ASCII) and form (flashing light, RS-232C, 20 mA current loop, etc.).

The Article Removal Enabler 7000 performs a logical "AND" function, requiring both Signals 4520 and 6240 to be present before issuing the Article Removal Authorization Signal 710 to Deactivator 540 of the EAS System 500 (FIG. 3). Thus, the issuance of the Signal 710 identifies to the EAS System 500 that (1) the user is authorized to remove the article 110 according to the Article Removal Authorization Signal 270, and (2) the article is in fact present at the terminal according to the measured Characteristic Verification Signal 4520.

In certain applications, it may be convenient to remove the User Identification Transmitter 5100 and/or the Article Identification Transmitter 5200 from the terminal 4000 and physically locate either or both near the AIC System 2000. Similarly, the Article Authorization Receiver 6100 may be removed from the terminal 4000 and located near the EAS System 500. However, it is preferred to incorporate or duplicate the deactivation and/or reactivation functions directly into the terminal 4000. In this case, the Article Authorization Receiver 6100 is not removed from the Terminal 4000, and Article Removal Authorization Signal 710 is wholly internal to the Terminal 4000. However, the Removal Preventer 350 would still stand alone and include a Duplicate Interrogator/Sensor 320 operating as described above.

Figure 5:
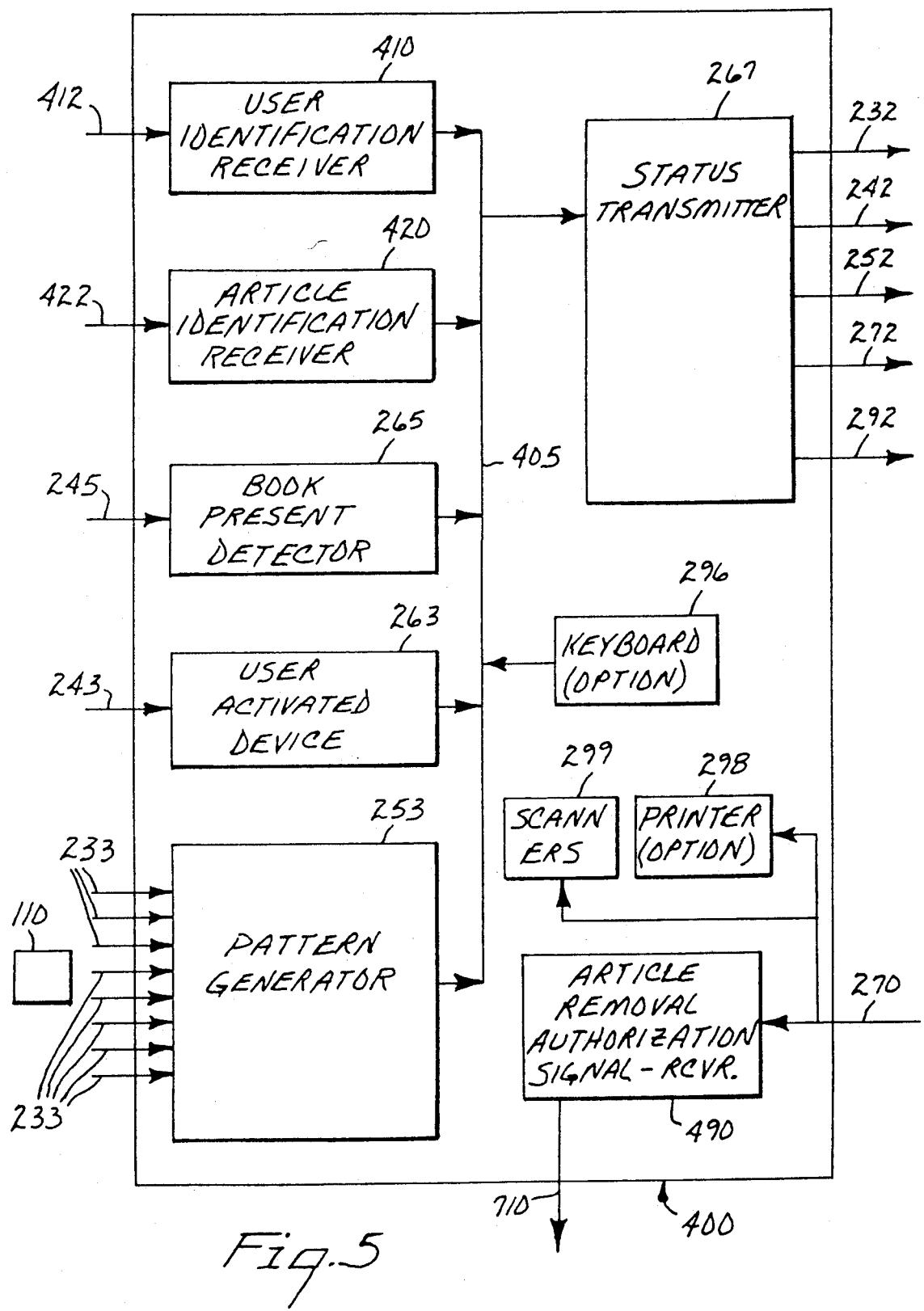
FIG. 5 is a schematic block diagram of the PSC Server of FIG. 1.

FIG. 5 is a schematic block diagram of the PSC Server Terminal 400 used in the preferred embodiment. The terminal 400 receives User Identification Data 412, and Article Identification Data 422, Book Present Status 245, User Action Requests 243, sensitized Article Responses 233 and Article Removal Authorization Signal 270. The PSC Server Terminal 400 sends the decoded User Identification Signal 232, the decoded Article Identification Signal 242, the recognition pattern of the sensitized Article Detection 252, the Book Present Status 272, the User Action Request Status 292 and the verified Article Removal Authorization Signal 710.

Items 412 and 422 may, in some cases, be combined and used to capture both the User I.D. and Article I.D. details. Consequently, in such cases a User Identification Receiver 410, connected to Line 412, and an Article Identification Receiver 420 connected to Line 422, can have their functions combined into a single device. Similarly, transmitted data 232 and 242 can also be combined.

An optional keyboard 296 or touch screen monitor and receipt printer 298 may also be present for the keying of user passwords and the receipting of Article Authorization details.

A user of the facility 100 who desires to use the facility enters his or her User I.D. Card 210 into the defined reading area. The User Activated Device 243 senses the presence of the User I.D. and signals to the PSC Controller 200 (FIG. 6) on Line 292.

The PSC Controller 200 responds on Line 270 with an instruction to turn on the Optical Scanner 299. The scanned User I.D. 412 is received and decoded at 410. The data is transmitted to the PSC Controller 200 on Line 232.

The PSC Controller 200 may now ask for a password to be entered on the keyboard 296 or touch screen monitor. Keyboard data is transmitted to the PSC Controller 200 on Line 232.

Figure 7:
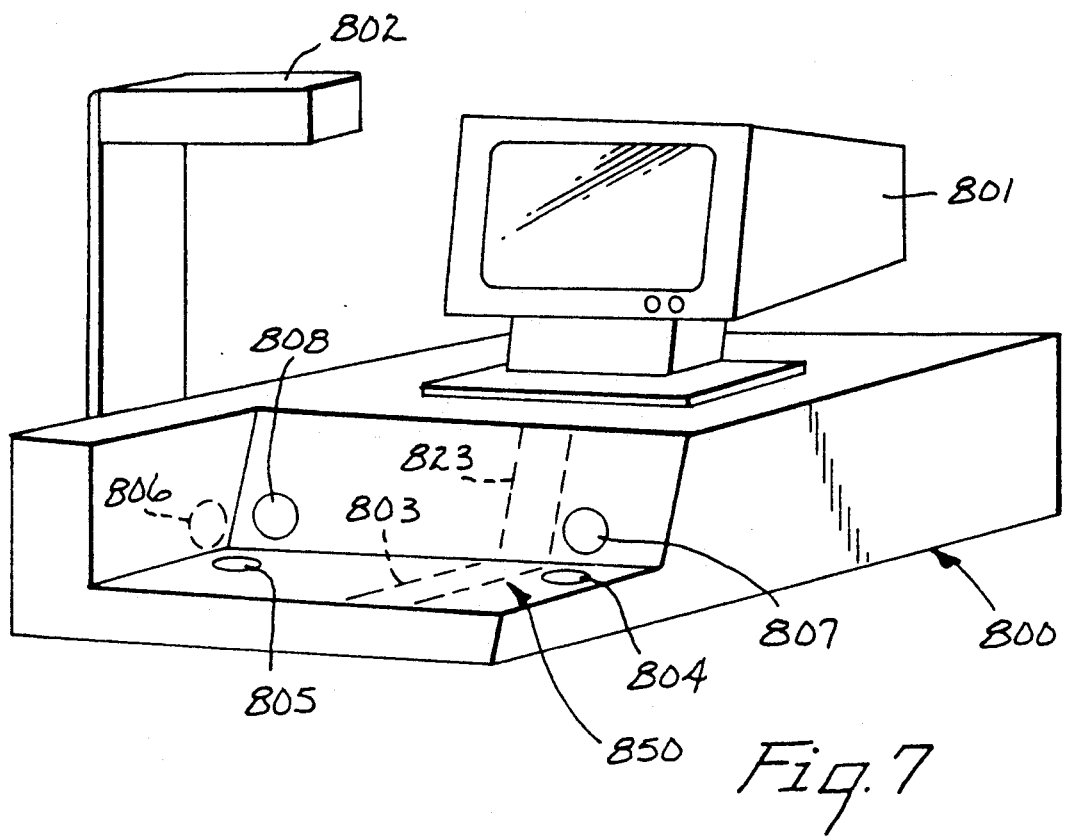
FIG. 7 is a perspective view of the PSC Server of FIG. 5 combined with the responder assembly of FIG. 8.

The article 110 to be authorized for removal is now placed in the desensitizing area 850, shown in FIG. 7.

Book Present Detectors 807 and 808 (FIG. 7) provide signal 245 which is detected by a Book Present Detector 265. This action is signalled to the PSC Controller 200 on Line 272.

The PSC Controller 200 now signals to the Optical Scanner 299 via Line 270 to activate, and scanned data is received on Line 412 or 422 and decoded in devices 410 or 420 respectively. The decoded data is sent to the PSC Controller 200 on Lines 232 or 242 respectively.

Internal processing within the PSC Controller 200, interacting with the data base via Line 233 determines the further validity of authorizing the issue of this article 110 to this user.

If the determination is that issue is approved, the PSC Server Terminal 400 is instructed to place the contents of a Pattern Generator 253 onto Transmission Lines 252. The Pattern Generator 253 is connected to a Multi-Strip Responder Assembly 803 (seen in FIGS. 7 and 8) which, together with other devices (e.g. 410, 420, 253) within the PSC Terminal 400, interconnect with a common bus 405. The PSC Controller 200 then makes a further determination as to how many sensitized articles are present in the desensitizing area 850. If the determination is that either one or none are present, the PSC Controller 200 issues the Article Removal Authorization Signal on Line 270. This action is directed to the Book Check Unit via Line 710. Some books may not contain an EAS Security Marker 310 and therefore would register as no marker present.

If the determination is that there is more than one article present, an instruction is displayed on the PSC Controller 200 directing the user to obtain assistance from facility staff, and removal authorization is inhibited. Accordingly, the user is prevented from removing a plurality of articles where only one is recorded as removed, as in the prior art arrangement.

Figure 6:
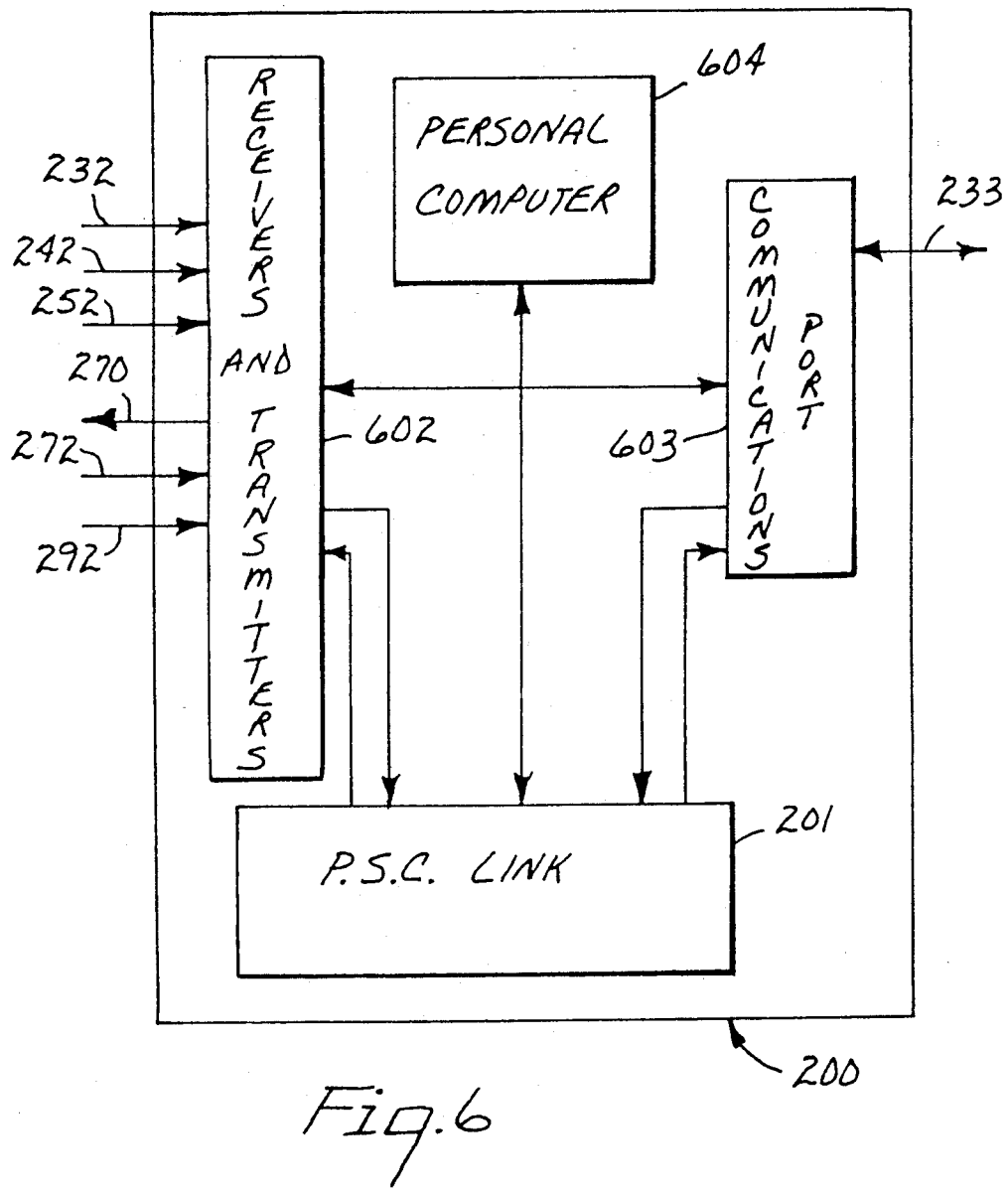
FIG. 6 is a schematic block diagram of the PSC Controller of FIG. 1.

Referring to FIG. 6, the functioning and timing of the PSC Server 400 is controlled by a processor and programs called PSC Link 201 which resides in the PSC Controller 200.

The PSC Controller 200 receives data from the PSC Server 400 such as the decoded User I.D. 232, the decoded Article I.D. 242, the contents 252 of the Pattern Generator 253, the status 272 of the Book Present Detector 265, the status 292 of the User Activate Device 263 and information from the data base via Line 233. The PSC Controller 200 sends information to activate the Article Removal Authorization Signal Receiver 490 via Line 270 and to the data base via Line 233.

PSC Link 201 is a combination of hardware and software which interfaces Receivers and Transmitters 602 to the Communications Port 603. The receivers and transmitters accept and hold data conditions as determined by the PSC Link 201.

The Communications Port 603 allows for connection to a customers mainframe. This port can be one of several types of Communication Port such as RS-232, Current Loop, 3270 Emulation but is not limited to this group.

When the PSC Link 201 senses that Line 292 (User Activate Device 263) has changed status, it causes Line 270 to transmit an instruction to the PSC Server 400 to activate a barcode reader 802, seen in FIG. 7.

Information returned from the PSC Server 400 on Line 232 is verified by PSC Link 201 to conform to the format of a User I.D. known to the facility 100.

The PSC Link 201 then causes this information to be transmitted to the user data base on Line 233 where it is verified that the user is known to the facility and that the user is in good stead with the facility and is authorized to obtain articles from the facility. Alternatively, the data base determines that the user has had his/her borrowing rights withdrawn.

The PSC Link 201 receives pre-authorization instructions from the data base and visually indicates a course of action to the user. If authorization is likely to be granted, a visual indication is displayed instructing the user to place an article for authorized removal into the desensitizing area 850. If authorization has been withdrawn, the PSC Controller 200 instructs the user to seek assistance from facility staff.

The PSC Link 201 then monitors Line 272 for a change in state and upon detecting this action signals to the PSC Server 400 via Line 270 to activate a barcode reader 802. Information returned from the PSC Server 400 on Line 232 or 242 is verified by PSC Link 201 to conform to the format of article I.D.'s known to his facility.

The PSC Link 201 then causes this information to be transmitted to the customers data base on Line 233 where it is verified that this article I.D. is known to the data base and that this article 110 does not have any prohibitions on its issue status.

Alternatively, a determination is made that this article 110 cannot be issued at this time.

If the article has been released for authorized issue the PSC Link 201 receives the contents of the Pattern Generator 253 from Line 252 and makes a determination as to the number of sensitized articles that are present in the desensitizing area 850. If this number is zero or one it issues the Article Removal Authorization Signal on Line 270, communicates with the data base on Line 233 to indicate the Removal Authorization on the current transaction has occurred and indicates by visual display to the user the options of his/her next action.

Alternatively, if the determination is that more than one sensitized article resides in the desensitizing area of the PSC Server 400, the Article Removal Authorization is not sent, the PSC Controller 200 communicates with the data base on Line 233 to cancel the current transaction and indicates by visual display to the user to seek assistance from facility staff.

The PSC Link 201 then monitors Line 272 and 292 for a change in state from which a determination is made that the user has removed his/her I.D. Card 210 in which case the session is terminated, or that an article has been removed and replaced with another indicating that there is a further Article Removal Authorization issue to occur.

FIG. 7 shows a preferred embodiment of the PSC Server Terminal chassis 800, which incorporates the PSC Server 400, on top of which is mounted a Visual Display Unit 801 portion of a Personal Computer 604 included in the PSC Controller 200. The remaining functions of the PSC Controller 200 can also be incorporated within the chassis 800. The embodiment of FIG. 7 includes the preferred configuration discussed above in which certain deactivation and multi-article pattern recognition are incorporated into the terminal. The Book Check Unit 500 is totally enclosed by the PSC Server Terminal chassis 800 case and the desensitizing area 850 of the Book Check Unit 500 is overlaid by a similar shape on the PSC Server Terminal chassis 800.

The bar code Optical Scanner 802 is shown on the left hand side but could also operate from the right hand side. It is dependent on the positioning of the Article I.D. Tag 220, which could be on either the front, rear or inside cover.

The sensitized Article Responder 803 is integrated into a formed non-ferrous shield structure 823 which overlays the case of the PSC Server 800. This same non-ferrous shield structure also contains detectors 805 and 804, for left and right hand operation respectively, which provide signals on Line 245 for the User Activated Device 263. This same formed non-ferrous structure 823 also contains the Book Present Detectors 808 and 807 which connect to Line 245 for left and right handed operation respectively.

The Article Removal Authorization Device is 806.

The terminal 800 shown in FIG. 7 is suitable for use in a library. The embodiment of FIG. 7 includes the preferred configuration discussed above, in which certain interrogation, sensing, and deactivation functions of the EAS system are additionally incorporated into the terminal. In this embodiment, the article 110 is a book, map, or other member of the collection of the library; a user of the facility is typically referred to as a "patron" of the library; and the EAS System 300 typically includes as the Removal Preventer 350 a gate which is normally locked. Typically, the patron, carrying the book, passes through an interrogation zone immediately before exiting from the library or an individual department of the library; if the electronic article surveillance system interrogates and senses an activated marker attached to the book (i.e. the marker was not temporarily deactivated as part of the book check out procedure), the gate is held shut, thereby preventing egress, and perhaps also activating a visible or audible alarm.

In the embodiment of FIG. 7, the Terminal 800 detects the request of a user by the action of that user placing his/her User I.D. 210 into a profile in the vicinity of the Detectors 805 or 804 for left or right handed operation. The identification card 210 in this embodiment has a user identification data encoded on it in the form of a bar code or by other means which can be optically detected. Bar Code Reader 802 scans the area in the vicinity of Detector 805 and transmits the detected data on Line 243.

Visual instructions are displayed on the Visual Display Unit 801 as to the courses of action now open to the user. Articles for authorized removal are placed into desensitizing area 850, being placed on top of the Users I.D. 210. The presence of an article in this position is sensed by Book Present Detectors 808 or 807, for left or right handed operation. Bar Code Reader 802 scans the article I.D. 220 and transmits this data to the PSC Server Terminal 400.

The sensitized Article Responder 803 determines the presence of a sensitized Marker 310 in any of several detection zones and transmits this pattern to the Pattern Generator 253 in the PSC Server Terminal 400.

If authorization to issue is determined, the Article Removal Authorization Device 806, an infrared LED, turns off, causing the Book Check Unit 500 to perform a desensitizing operation, desensitizing the sensitized Marker 310, thereby allowing the Article 110 to be moved through the EAS System 300 without activating the Removal Preventer 350.

Figure 8:
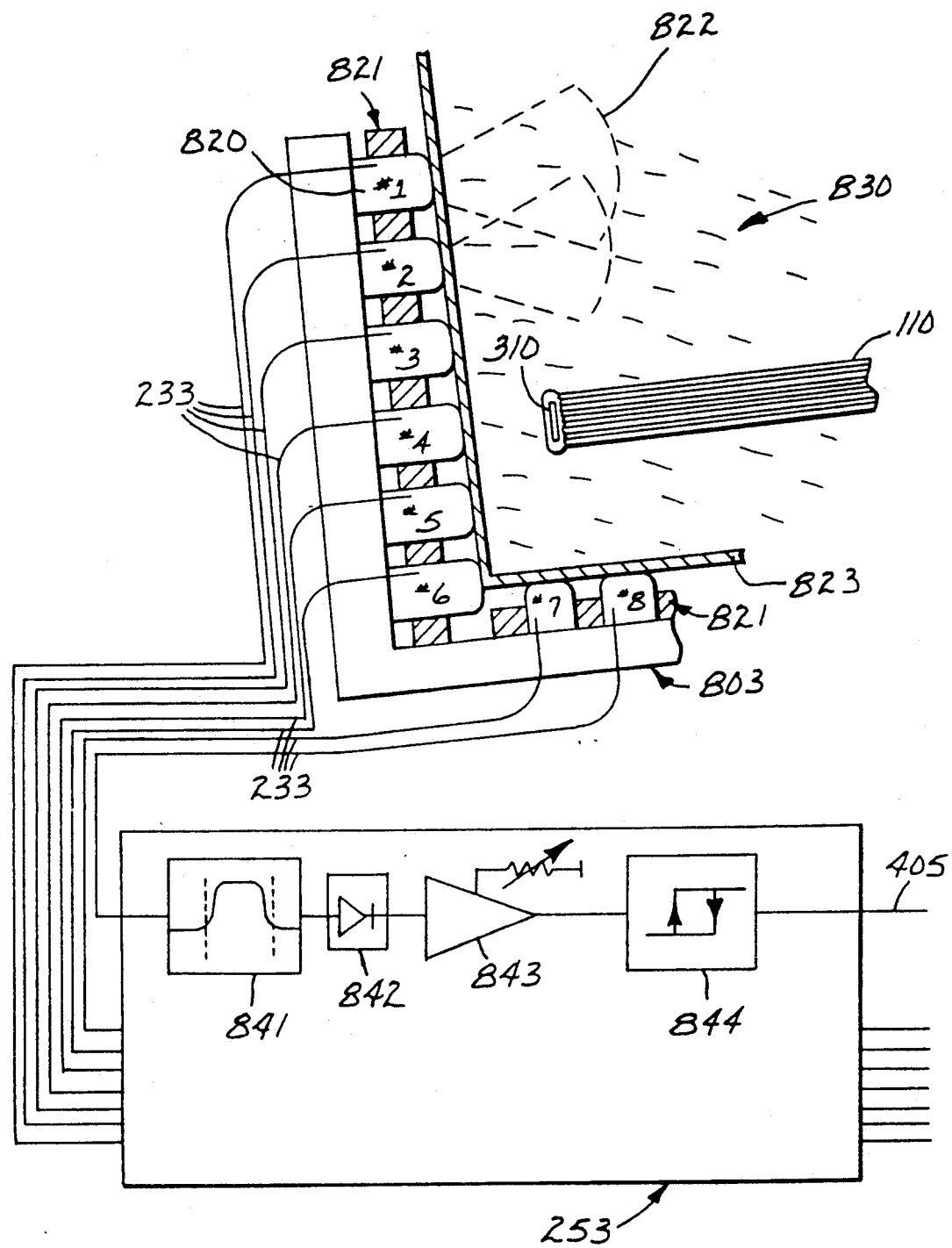
FIG. 8 is a side elevation view of the responder assembly.

FIG. 8 is a side cut-away view of a preferred embodiment of the Multi-Strip Responder Assembly 803 which incorporates an array of Sensors 820 #1-8 which cover six horizontal zones and two vertical zones.

Figures 12A, 12B, 12C:
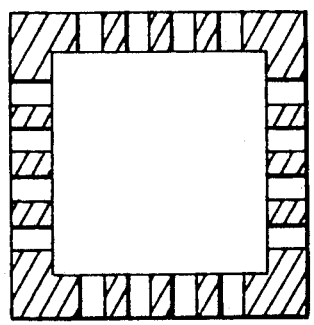
FIGS. 12A to 12C show cross-sectional views of various waveguide embodiments for various other sensor configurations.

Any number of sensors 820 can be provided in any configuration dependent on the type and style of the Article 110 having a marker strip 310. FIGS. 12A to 12C show various arrangements of arrays that can be used depending on particular circumstances. FIGS. 12A and 12B show respectively square and circular arrays that may be useful in a stores environments in which a conveyor passes through the center of the array. FIG. 12C shows a semi-elliptical array.

Referring again to FIG. 8, a waveguide 821, arranged adjacent the sensors 820 is provided to focus areas of sensitivity of the sensors 820 into detection zones 822 which are substantially conical in shape. The waveguide 821 acts in a manner similar to the dish of a radar antenna to focus electromagnetic energy onto the sensors 820 for detection. The detection zones 822 may be broadened or narrowed by the placement of the waveguide 821 fore or aft of the sensors 820. The detection zones 822 associated with each sensor 820 can therefore have a beam width of between about 20° to 70° and preferably approximately 45°. The detection zone 822 coverage is set according to the characteristics of the items to be detected.

Figures 11A, 11B:
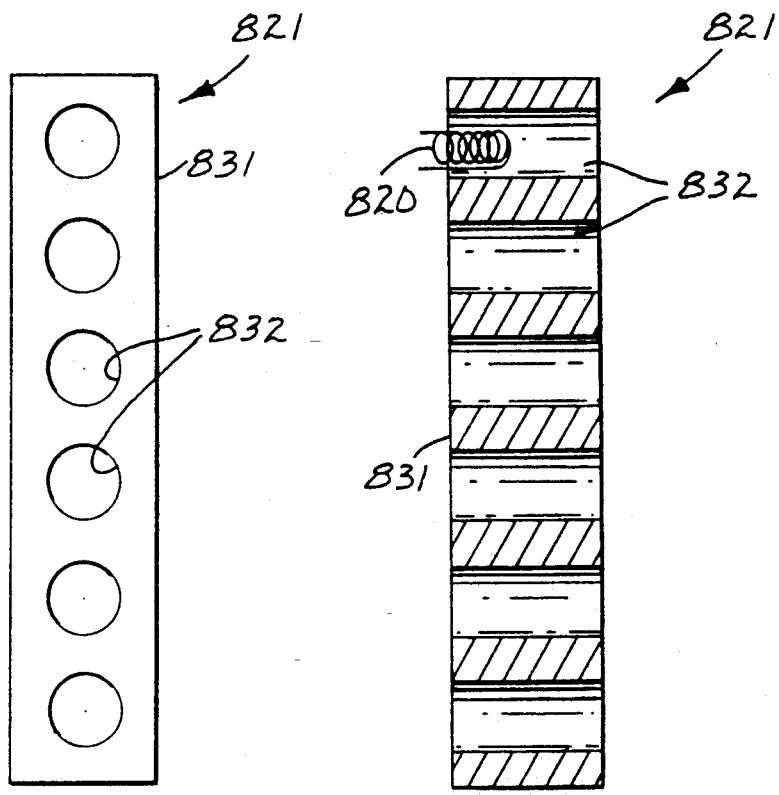
FIGS. 11A and 11B are front and side cross-sectional views respectively of part of the waveguide of FIG. 8.

In FIGS. 11A and 11B, the waveguide 821 is shown formed of a metal block 832 in which a number of holes 832 are formed, by drilling for example. The sensors 820, in the preferred embodiment are formed as an aircored coil of wire, as seen in FIG. 11B, which are locateable near or within the holes 832. The holes 832 act as a simple and inexpensive tunnel which focus received energy into a narrow beam.

Returning to FIG. 8, the marker 310 is energized by an alternating electromagnetic field 830 generally derived from an A.C. mains supply. The field 830 can be provided in any known manner but in the preferred embodiment is provided as the deactivator 540 of the Book Check Unit 500 in the manner earlier described, and acts to energize a sensitized marker 310 which thereby responds by emitting (transponding) multiple frequencies from a fundamental frequency of the field 830 (e.g. 50 or 60 Hz) to the 200th harmonic and higher. Due to the nature of the metal typically used in the marker 310, the harmonics decrease in amplitude substantially linearly, and hence can be detected relatively easily.

The sensors 820 act to receive radio frequency energy transponded from the or each marker 310 that is active within its respective zones 822. The sensors 820 output via lines 233 to the Pattern Generator 253.

The manner in which the sensors 820 discriminate multiple markers 310 is determined by the physical relationship of the detection zones 822 and the worst case arrangement of article 110.

Figure 10C:
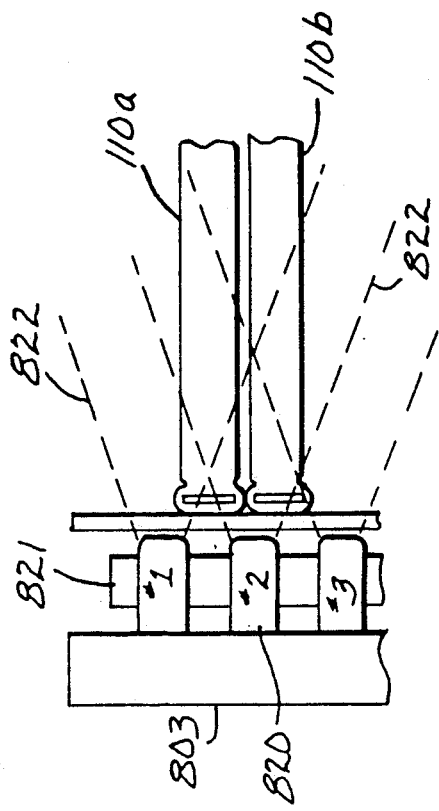
FIGS. 10A-D illustrate how various marker arrangements are detected.
Figure 10D:
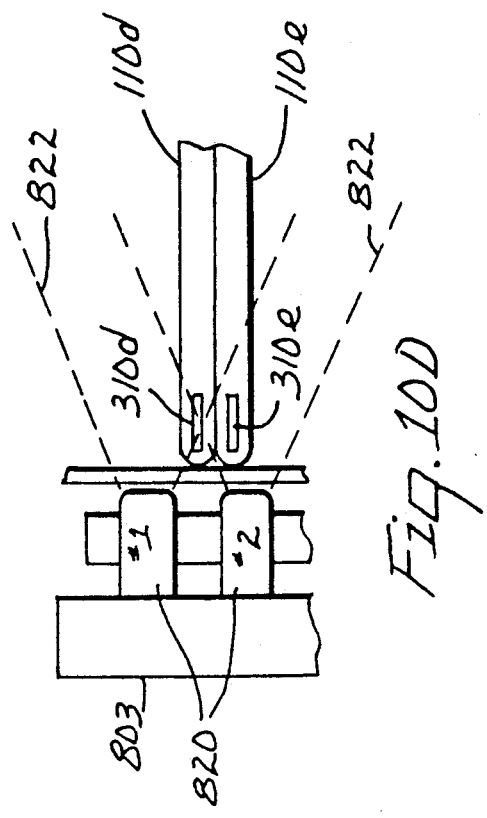
Figure 10A:
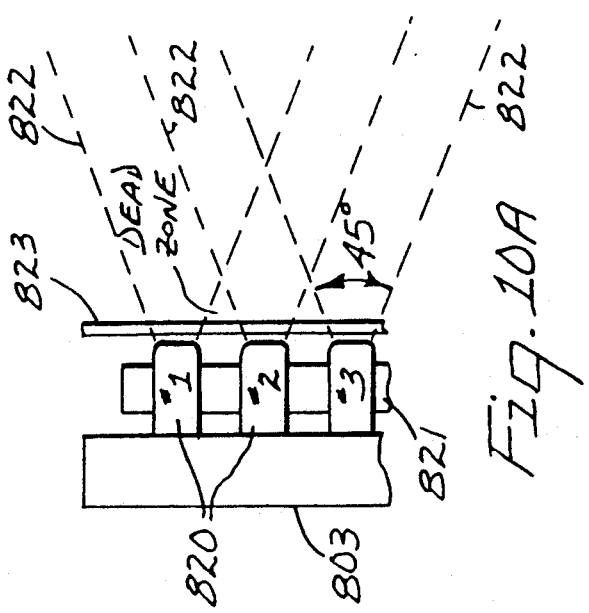

Referring to FIG. 10A, each of the sensors 820 are generally displaced from it's neighbor by 5-20 mm and preferably about 12 mm (measured from the center of each sensor 820) as illustrated. Where the detection zones 822 have a beam width of at least 45°, a dead zone as depicted in FIG. 10A exists between adjacent sensors 820. A sensitized strip lying wholly within any one of these dead zones will not be detected. The markers 310 are generally larger than 4 mm in their smallest dimension with the above preferred configuration, the dead zones are no wider or deeper than 4 mm.

The size of the dead zones is adjusted by altering the beamwidth of the detection zones 822 by moving the waveguide 821 fore and aft of the sensors 820 to narrow or broaden the zones 822 respectively.

Correct adjustment is achieved when the mid-point of a marker 310 is seen by two sensors 820. Thereafter, following displacement of the marker 310 by about 1 mm, one of the sensors 820 no longer sees the marker 820. Accordingly, an exact switch from one sensor 820 to the other is provided when the marker 310 is moved horizontally in front of the sensor 820.

Figure 10B:
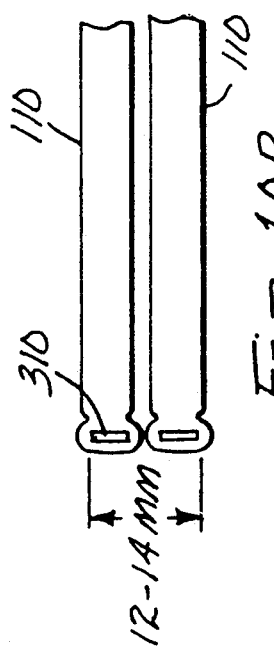

FIG. 10B illustrates the maximum density of markers 310 envisaged when two books 110 having sensitized marker strips 310 in the spines are laid upon each other. Typically, the outer edges of the marker strips 310 are 12-14 mm apart. It will be understand that the books 110 have to be a certain minimum dimension in order that there is sufficient space within which to locate the marker strip 310.

FIG. 10C shows a typical dense arrangement in which the strips of two adjacent books 110a and 110b are seen by three sensors 820. The strip of book 110a is seen by sensors #1 and #2 and the strip of book 110b is seen by sensor #2 and just encroaching the detection zone 822 of sensor #3.

The presently disclosed arrangement has been tested and consistently detects at least 80% of multiple marker strips which represents a substantial improvement over the detectability of prior art systems.

However, there is a minimum book size that cannot be resolved, such as that represented in FIG. 10D where periodicals 110d and 110e such as magazines and newspapers have their marker strips 310 placed "between the pages" and accordingly are longitudinally aligned with the detection zones 822. A high probability of detection is maintained because the strip edge seen in FIG. 10D with respect to marker 310d extends out of the dead zone between sensors #1 and #2 and is therefore detectable.

The Pattern Generator 253 processes the outputs of each sensor 820 in a like manner and outputs a digital pattern on the 8-bit bus 405. In FIG. 8, the internal schematic of the Pattern Generator 253 is shown only for sensor #8 for clarity. Each sensor 820 connects firstly to a band pass filter 841 which rejects the fundamental and the lower 20 harmonics. The next 40 harmonics are passed and the remainder rejected. The pass-band can be varied to specific requirements. The pass-band is amplified and rectified in device 842 which feeds a gain adjustment circuit 843 which allows for the detection range of the respective cone 822 to be adjusted to extend between 15-40 mm out from the surface of the formed non-ferrous cover plate 823. Signals detected by the sensor 820 are then digitized in a Schmitt trigger 844 which outputs onto the corresponding line of the bus 405.

The bus 405 thereby has a pattern of digital signals which is indicative of none, one, or more than one sensed active markers 310 present in the field 830.

The pattern is transferred to the PSC Controller 200 where the PSC Link 201 processes the pattern to determine whether none, one or more than one active markers 310 are sensed. The PSC Link 201 contains a look-up table of legitimate patterns that can be output from the pattern generator 253. If only one sensor 820, or if two adjacent sensors 820 detect a sensitized marker 310, then the determination is made that only one marker 310 is present. If two non-adjacent sensors or more than two sensors in any configuration detect sensitized marker strips 310, then the determination is made that more than one sensitized strip is present. Once PSC Link 201 determines where none, one, or more than one active markers 310 present, the Personal Computer 604 then issues instructions earlier described either authorizing removal or rejecting the transaction.

Table 1 below shows those valid patterns that permit authorization for removal. Because each pattern corresponds to a particular number, a single subtraction process can be used to evaluate the patterns. If either of sensors #7 or #8 provide a signal output, authorization is inhibited as this is indicative of the Terminal 800 not being used correctly whereby the article 110 must be placed hard against both the horizontal and vertical surfaces of the non-ferrous shield structure 823.

TABLE 1

| Sensor | #1 | #2 | #3 | #4 | #5 | #6 | #7 | #8 |
|---|---|---|---|---|---|---|---|---|
| Weight | 128 | 64 | 32 | 16 | 8 | 4 | 2 | 1 |
| Valid Patterns | 0 | 0 | 0 | 0 | 0 | 1 | 0 | 0 |
| | 0 | 0 | 0 | 0 | 1 | 1 | 0 | 0 |
| | 0 | 0 | 0 | 1 | 0 | 0 | 0 | 0 |
| | 0 | 0 | 0 | 1 | 1 | 0 | 0 | 0 |
| | 0 | 0 | 1 | 0 | 0 | 0 | 0 | 0 |
| | 0 | 0 | 1 | 1 | 0 | 0 | 0 | 0 |
| | 0 | 1 | 0 | 0 | 0 | 0 | 0 | 0 |
| | 0 | 1 | 1 | 0 | 0 | 0 | 0 | 0 |
| | 1 | 0 | 0 | 0 | 0 | 0 | 0 | 0 |
| | 1 | 1 | 0 | 0 | 0 | 0 | 0 | 0 |

Figure 9:
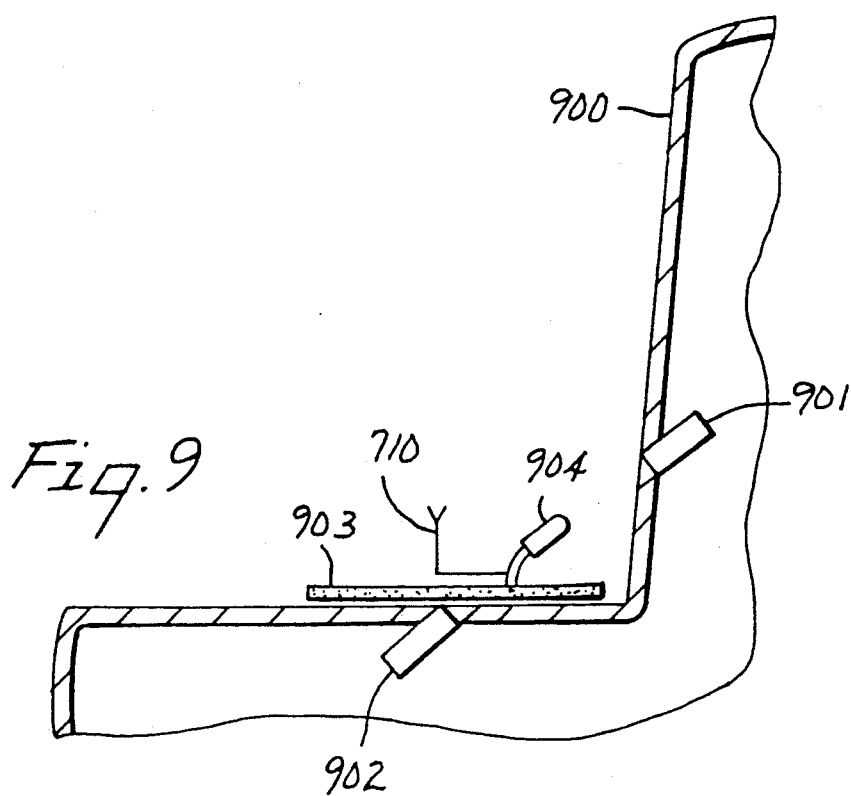
FIG. 9 is a side cut-away view of a preferred activation unit for the desensitizer of FIG. 3.

FIG. 9 is a side cut-away view of an alternative embodiment of an Article Removal Authorization Signal Device 910 which is a non-intrusive attachment to the EAS Book Check Unit 500.

The existing case 900 of the Book Check Unit 500 contains two apertures in which are located a Beam Transmitter 902 and a Beam Detector 901.

A beam passes from one to the other, and when this beam is interrupted, it is the indication to the Book Check Unit 500 that an Article 110 is within the desensitizing area 850 and that the Book Check Unit 500 should perform the desensitize operation.

In this preferred embodiment an Auxiliary Device 903 permanently interrupts this beam from the Transmitter 902 to the Detector 901 and replaces it with a secondary beam made up from a Secondary Beam Transmitter 904 and the existing Beam Detector 901.

Secondary Beam Transmitter 904 is controlled by Line 710 from the Article Removal Authorization signal Circuit 490. Line 710 is switched to "interrupt" status when the PSC Server 400 is instructed to authorize article removal.

The foregoing describes only a number of embodiments of the present invention and modifications, obvious to those skilled in the art can be made thereto without departing from the scope of the present invention.

We claim:

1. A responder assembly comprising:
    a plurality of sensors,
    means for creating an electromagnetic field within a zone of sensitivity associated with each said sensor, said field being adapted to energize one or more sensitized markers located within said zones which thereby transpond energy for detection by one or more of said sensors, and
    processing means connected to each said sensor for providing a detection pattern corresponding to detection of responded energy from one or more of said sensors, said pattern being processed to determine whether none, one, or more than one of said markers is present within said zones.

2. A responder assembly as claimed in claim 1 wherein dead zones within said electromagnetic field and outside said zones of sensitivity are no larger than a smallest dimension of said markers.

3. A responder assembly as claimed in claim 2 wherein said sensors are spaced apart at between 5 to 20 mm centers.

4. A responder assembly as claimed in claim 3 wherein said sensors are spaced apart at about 12 mm centers.

5. A responder assembly as claimed in claim 1, wherein said sensors are arranged such that the zones of sensitivity of adjacent sensors overlap.

6. A responder assembly as claimed in claim 5 further comprising focussing means associated with said sensors for determining a shape of said zones of sensitivity.

7. A responder assembly as claimed in claim 6, wherein said zones are substantially conical in shape.

8. A responder assembly as claimed in claim 6 wherein said focussing means is adapted to vary a detection beam width of said zones.

9. A responder assembly as claim in claim 8 wherein said beam width is variable between 20° and 70°.

10. A responder assembly as claimed in claim 9 wherein said beam width is about 45°.

11. A responder assembly as claimed in claim 10 wherein dead zones within said electromagnetic field and outside said zones of sensitivity are smaller than 4 mm.

12. A responder assembly as claimed in claim 6 wherein said focussing means comprises a waveguide formed of at least one metallic section having a plurality of holes corresponding to said sensors, one of said sensors being locateable near or within each one of said holes.

13. A responder assembly as claimed in claim 1, wherein said sensors are configured as an array such that said zones of sensitivity combine to provide an area of sensitivity of said responder assembly having a predetermined shape.

14. A responder assembly as claimed in claim 13, wherein said predetermined shape is selected from the group consisting of substantially rectangular, substantially circular and substantially semi-elliptoid.

15. A responder assembly as claimed in claim 13, wherein some of said sensors are linearly arranged in one direction and other said sensors are linearly arranged in another direction.

16. A responder assembly as claimed in claim 15, wherein the directions are substantially perpendicular to each other such that said area of sensitivity is substantially rectangular.

17. A responder assembly as claimed in claim 1, wherein said electromagnetic field alternates at a fundamental frequency and said sensitized markers transpond energy at said fundamental frequency and at a plurality of harmonic frequencies associated with said fundamental frequency for detection by said sensors.

18. A responder assembly as claimed in claim 17, wherein said sensors detect transponded energy up to at least the 200th harmonic frequency.

19. A responder assembly as claimed in claim 17, wherein a selected set of said harmonic frequencies is passed by said processing means and digitized to form said pattern.

20. A responder assembly as claimed in claim 19, wherein said selected set includes frequencies from about the 20th harmonic to the 60th harmonic.

21. A responder assembly as claimed in claim 19 wherein said computing means includes a look-up table of predetermined patterns which are correlated with said pattern so as to indicate none, one, or more than one sensitized markers within said field and said zones.

22. A responder assembly as claimed in claim 1, wherein said processing means includes computing means for determining whether one or more than one of said markers are detected within more than one of said zones by analyzing the pattern derived from adjacent ones of said sensors.

23. A article removal control system for enabling removal of a selected one or more of a plurality of articles from a facility, said system comprising:
   an article inventory control sub-system in which each said article and each user of said facility is identifiable to record and process information regarding authorization or inhibiting removal of one or more of said articles by an individual said user, each said article being provided with a sensitizable marker that is desensitized to permit removal of an article from said facility and sensitized on return to said facility,
   a desensitizer connected to said article inventory control sub-system for desensitizing a marker to permit removal of the corresponding article from said facility upon authorization from said article inventory control sub-system, and
   a responder assembly as claimed in claim 1 connected to said article inventory control sub-system to permit authorization of said desensitizer when only one sensitized marker is detected within said zones.

24. A system as claimed in claim 23, wherein said desensitizer and said responder assembly are provided within an article check unit wherein said electromagnetic field is provided by said desensitizer.

25. A system as claimed in claim 24, wherein said desensitizer emits a non-alternating electromagnetic field to desensitize said marker on receipt of said authorization, and an alternating electromagnetic field when an article is received by said article check unit.

26. A system as claimed in claim 23, further comprising an electronic article surveillance sub-system to prevent unauthorized removal of an article from said facility.

27. A system as claimed in claim 23, further comprising user and article identification means for identifying a particular user and particular article of said facility and communicating identification data to said article inventory control sub-system so as to determine authority for said particular user to remove said particular article, wherein when said authority is valid, said article identification sub-system enables said responder assembly to permit authorization of said desensitizer.

28. A system as claimed in claim 27, wherein said desensitizer, said responder assembly and said user and article identification means are provided within an article check unit wherein said electromagnetic field is provided by said desensitizer.

* * * * *